United States Patent [19]
Lynch et al.

[11] Patent Number: 5,938,748
[45] Date of Patent: Aug. 17, 1999

[54] DATA TRANSFER MECHANISM FOR TRANSFER OF REAL-TIME DATA INCLUDING REAL-TIME DATA COMPUTED ON-THE-FLY

[75] Inventors: John Lynch, San Jose; James B. Nichols, San Mateo, both of Calif.

[73] Assignee: Apple Computer, Inc., Cupertino, Calif.

[21] Appl. No.: 08/928,024

[22] Filed: Sep. 11, 1997

Related U.S. Application Data

[62] Division of application No. 08/285,542, Aug. 2, 1994, Pat. No. 5,727,233.
[51] Int. Cl.⁶ .............................. G06F 13/14; G06F 12/02
[52] U.S. Cl. ................................. 710/53; 710/33; 710/65; 711/127; 711/157
[58] Field of Search ................................... 710/33, 65, 53; 711/100, 127, 157

[56] References Cited

U.S. PATENT DOCUMENTS

| | | | |
|---|---|---|---|
| 4,298,954 | 11/1981 | Bigelow et al. | 364/900 |
| 5,163,132 | 11/1992 | DuLac et al. | 395/275 |
| 5,636,362 | 6/1997 | Stone et al. | 395/456 |
| 5,664,122 | 9/1997 | Rabe et al. | 395/308 |

*Primary Examiner*—Thomas C. Lee
*Assistant Examiner*—Rehana Perveen
*Attorney, Agent, or Firm*—Burns, Doane, Swecker & Mathis, L.L.P.

[57] ABSTRACT

A data transfer mechanism for a serial interface is provided whereby data transfer may be precisely controlled, eliminating the need for significant buffering. The data transfer mechanism also provides for flexible data transfer in either a byte mode or a burst mode so as to accommodate any of various telecommunications devices having a range of capabilities and data rates, and minimizes host involvement in the data transfer operation.

11 Claims, 8 Drawing Sheets

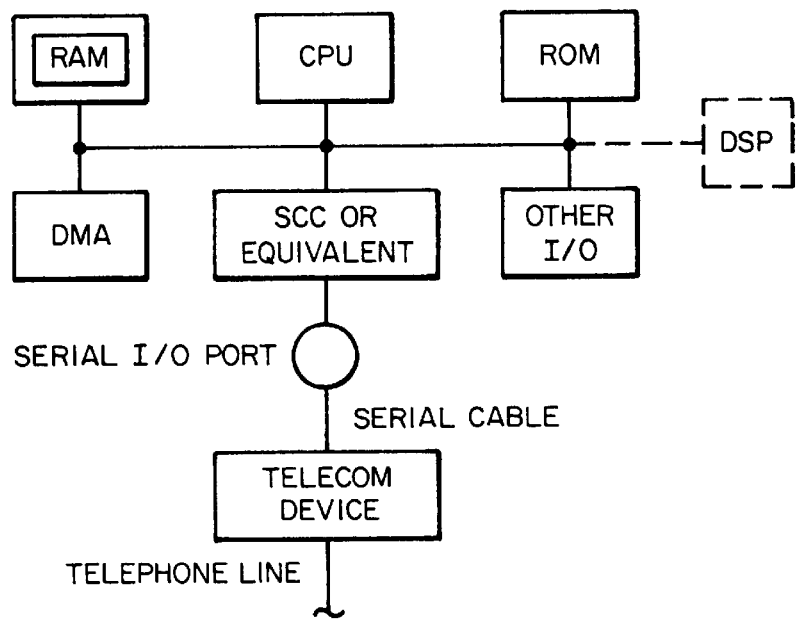
FIG_1
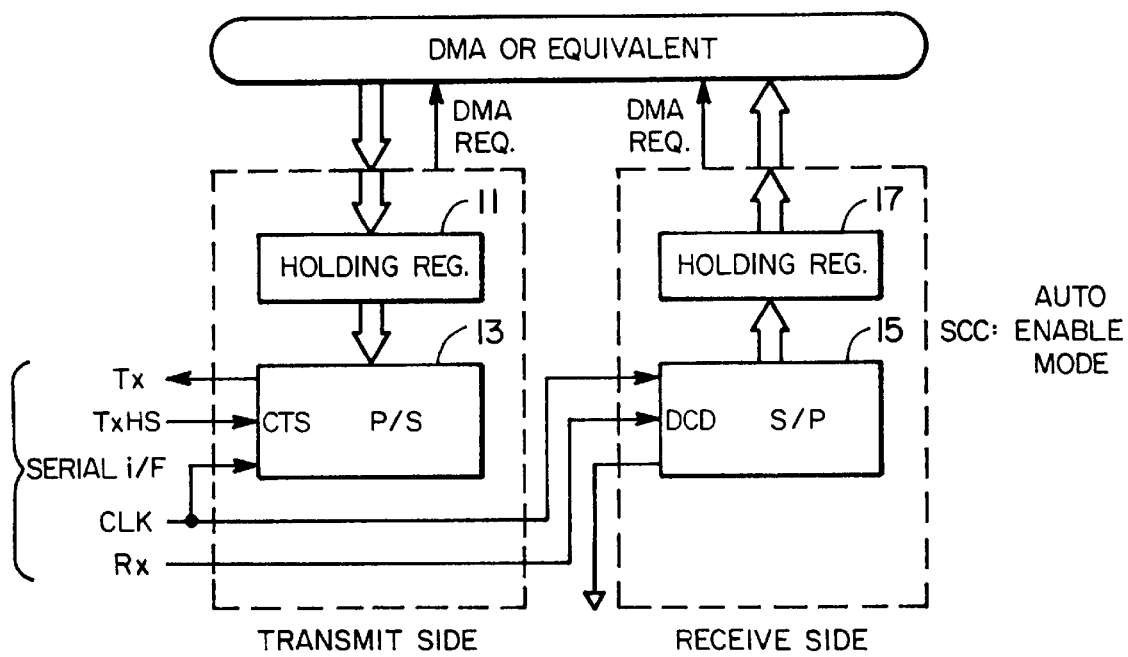
FIG_2

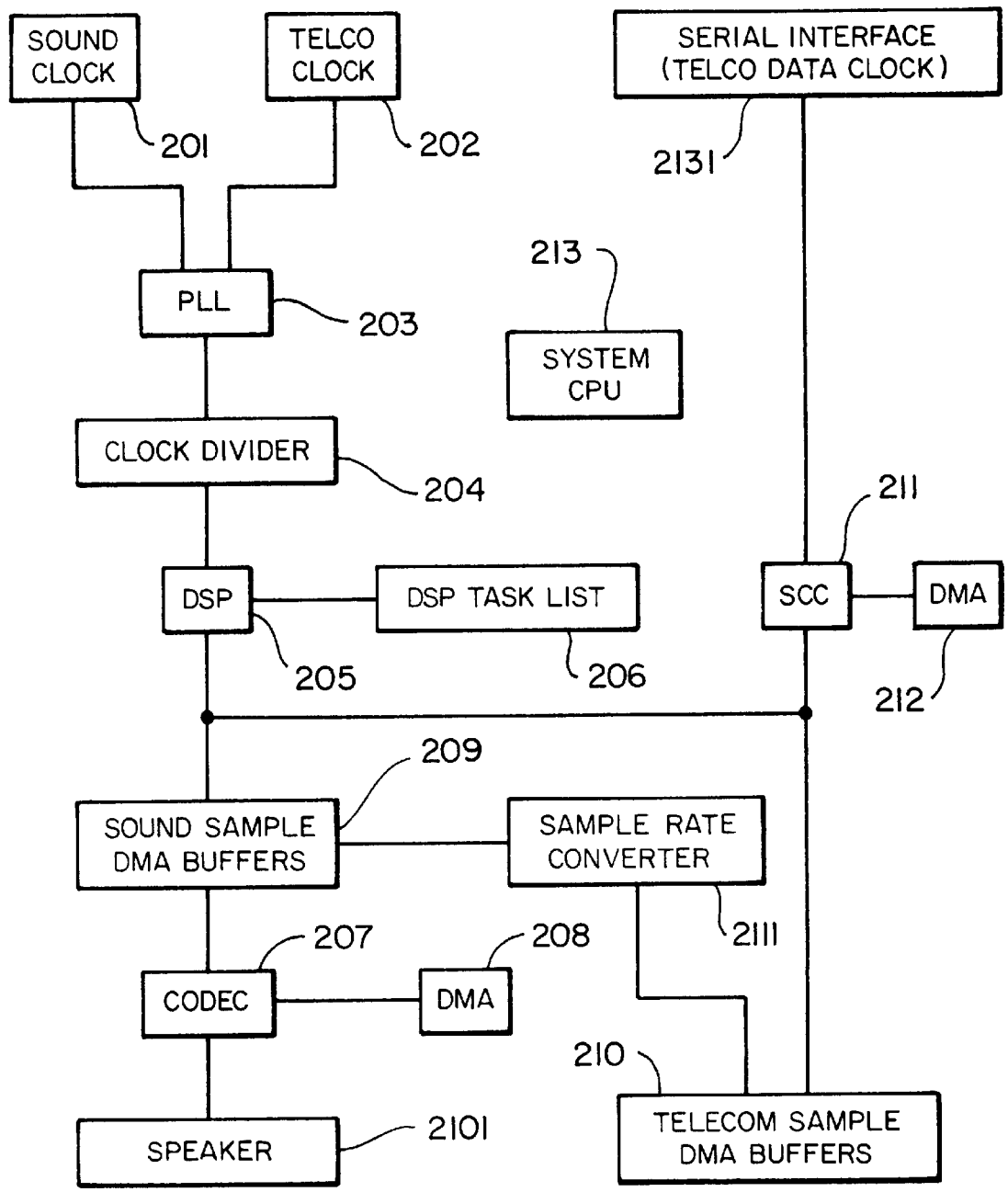
FIG_3

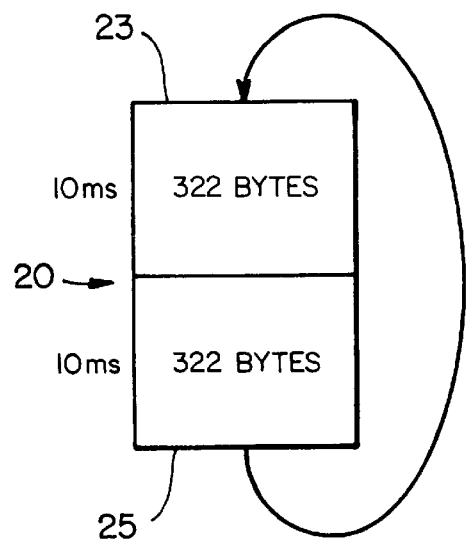
FIG_4
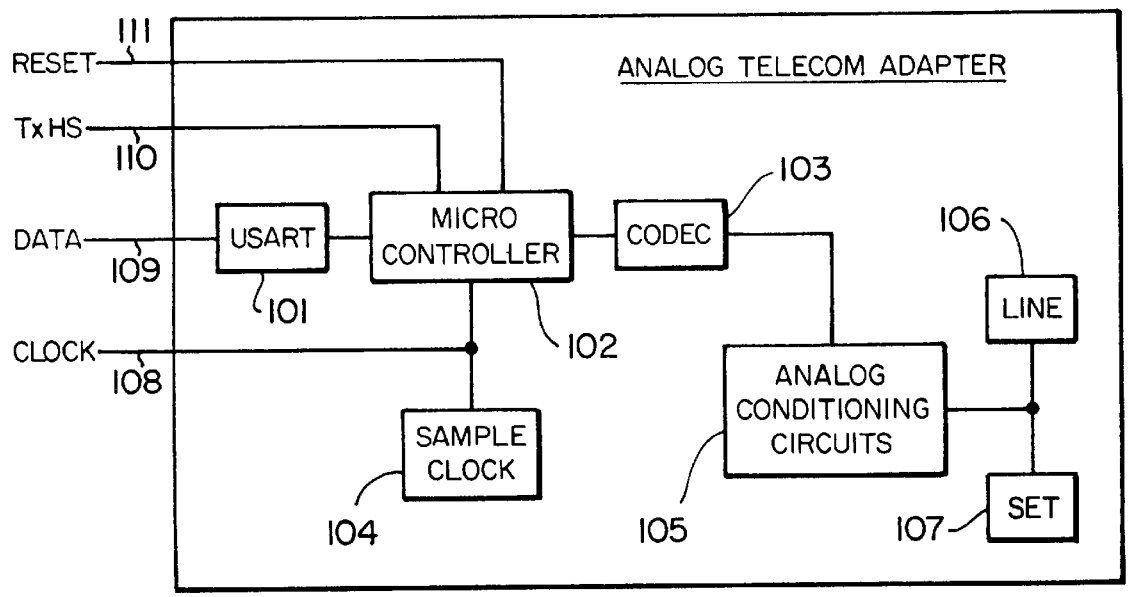
FIG_5

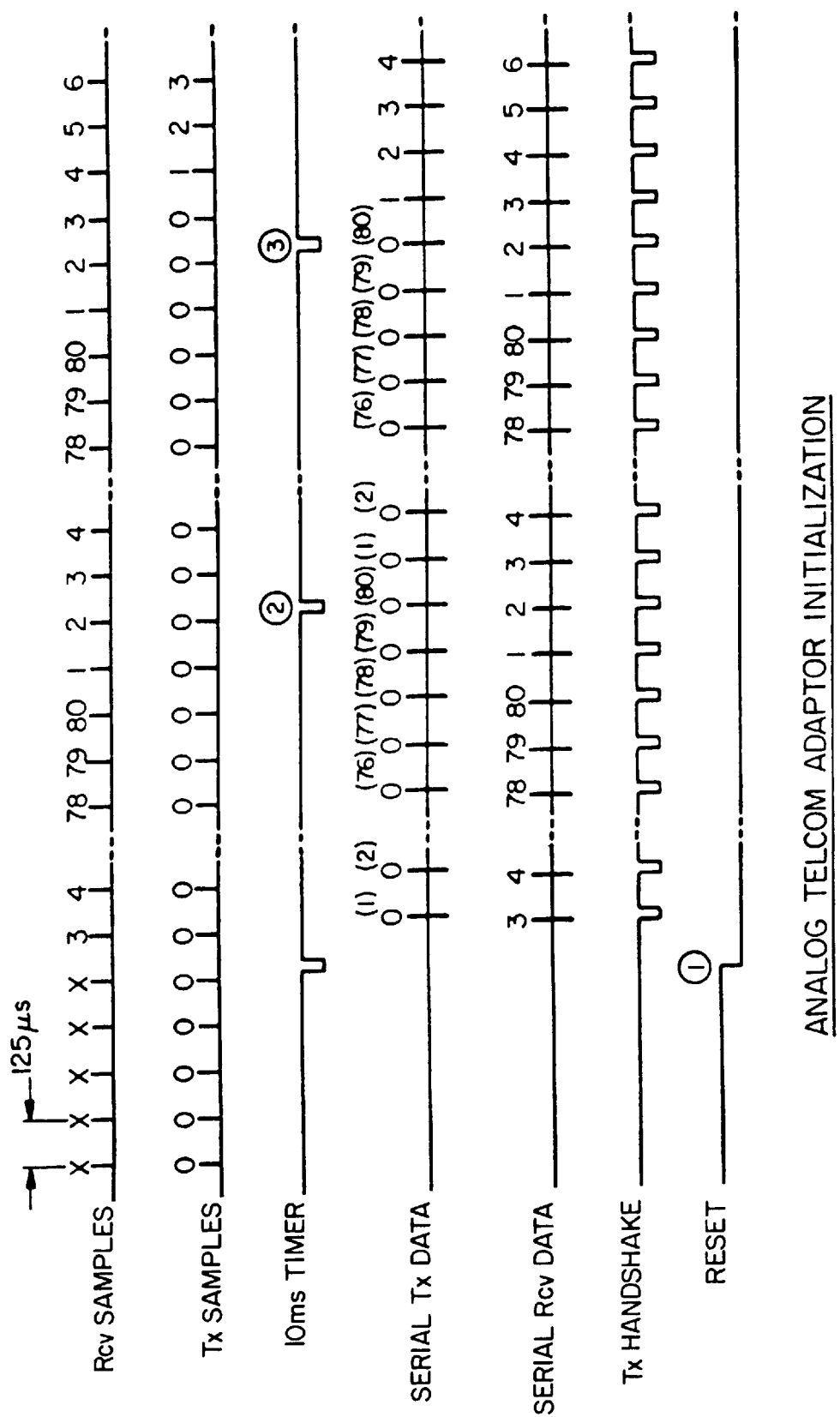
FIG_6
ANALOG TELCOM ADAPTOR INITIALIZATION

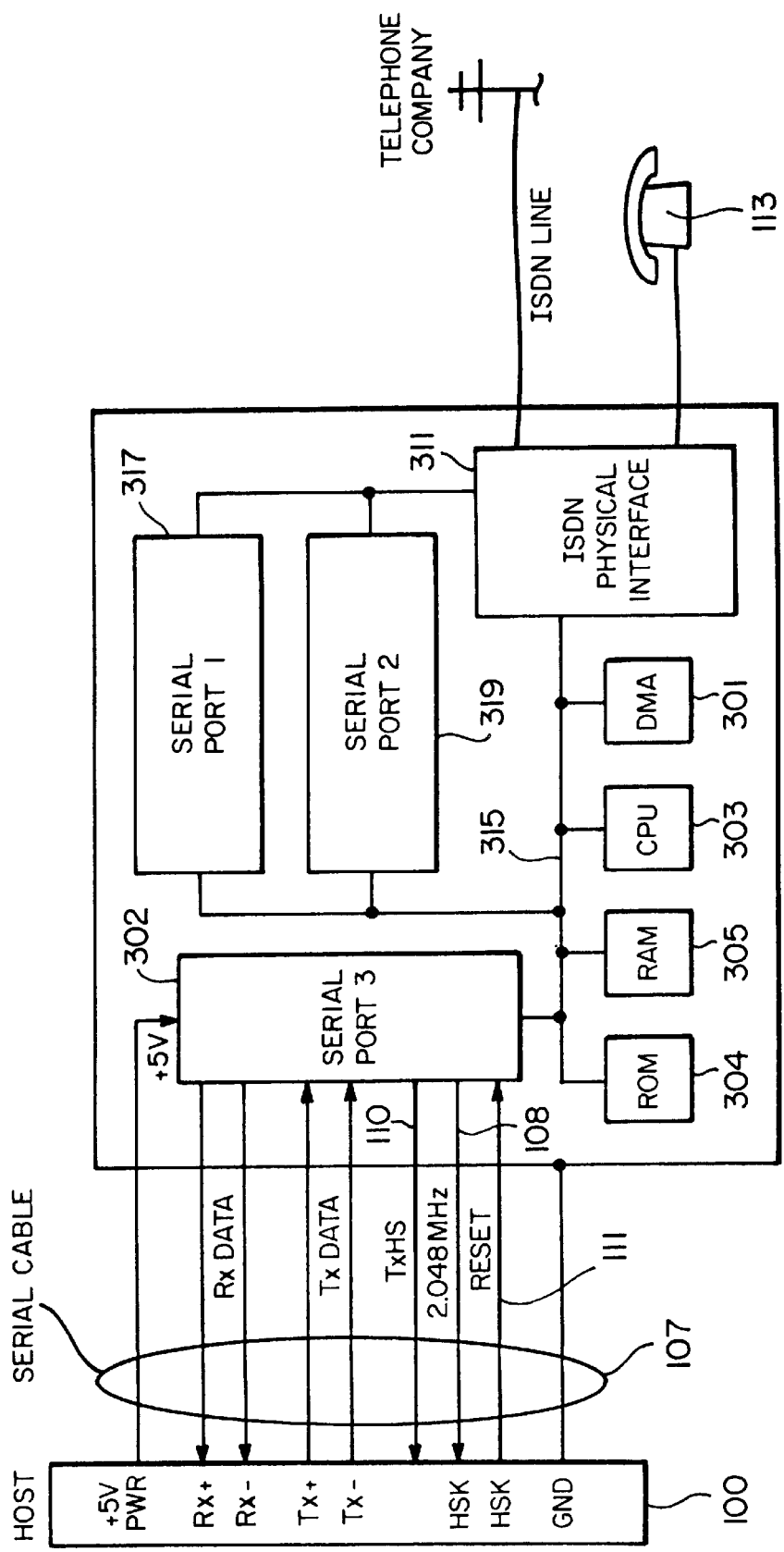
FIG_7

FIG_8

ISDN TELECOM ADAPTOR INITIALIZATION

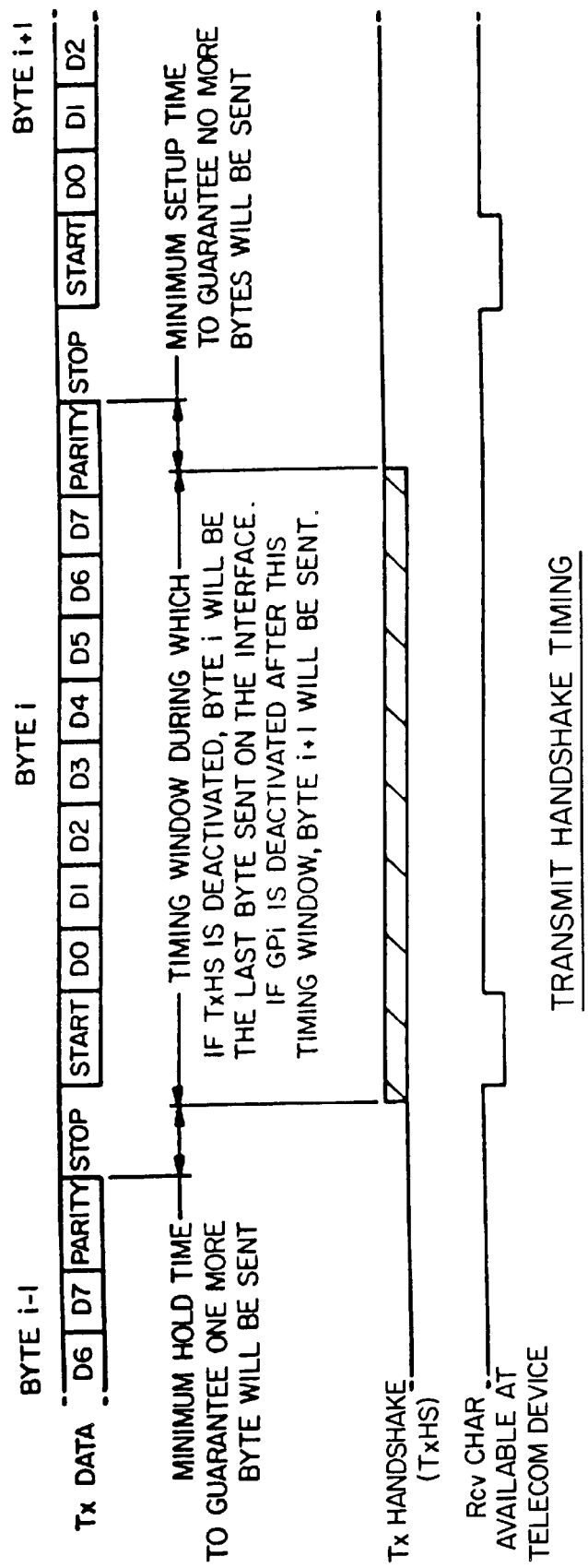
FIG_9
TRANSMIT HANDSHAKE TIMING

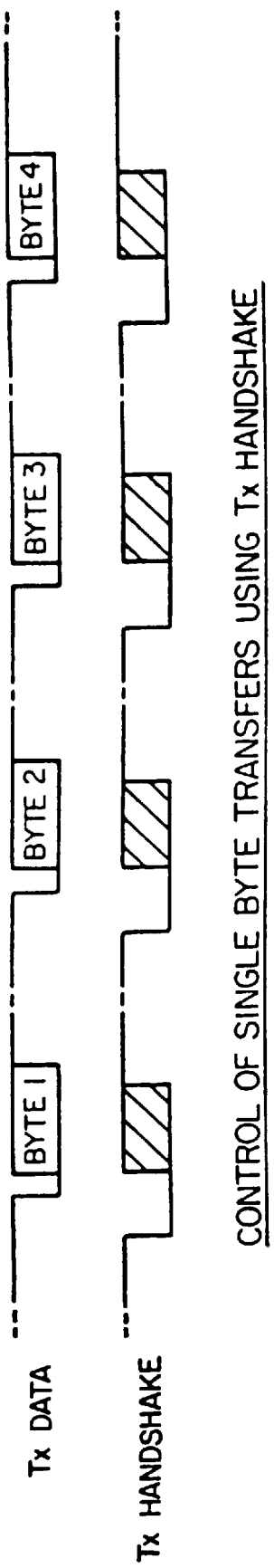
CONTROL OF SINGLE BYTE TRANSFERS USING Tx HANDSHAKE
FIG_10
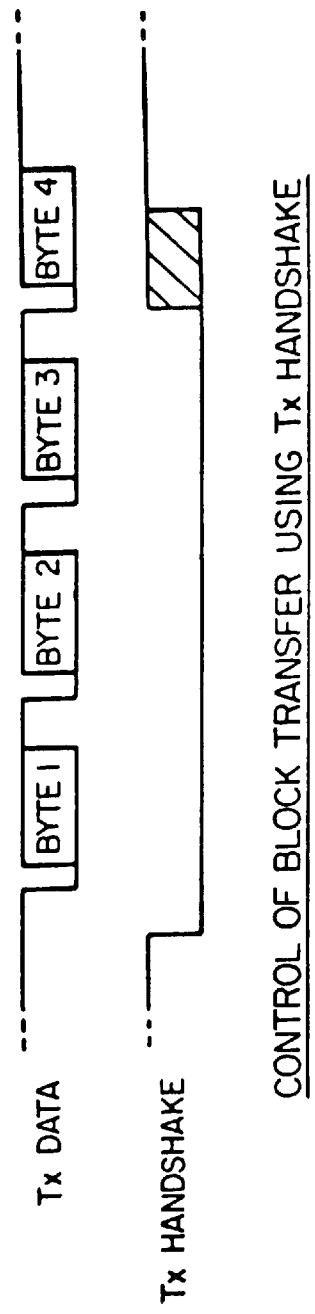
CONTROL OF BLOCK TRANSFER USING Tx HANDSHAKE
FIG_11

DATA TRANSFER MECHANISM FOR TRANSFER OF REAL-TIME DATA INCLUDING REAL-TIME DATA COMPUTED ON-THE-FLY

This application is a divisional of application Ser. No. 08/285,542, filed Aug. 2, 1994 (now U.S. Pat. No. 5,727, 233).

BACKGROUND OF THE INVENTION

1. Field of the Invention

The present invention relates to data telecommunications and more particularly to data transfer mechanisms for serial communications interfaces.

2. State of the Art

Personal computers and computer workstations with modems now access a wide variety of networks. Although, from the standpoint of a user, data transfer using a modem may appear to be relatively simple, the actual data transfer operation may be considerably involved. For example, as between the computer and the modem, the rate at which one device generates data and the rate at which the other device is able to process data will generally not coincide. This non-coincidence of data rates necessitates the use of device buffers and flow control to pace data transfer between the two devices. Flow control assures that one device does not overflow the data buffer of the other device.

In the direction from the modem to the computer, the computer may become busy with other tasks besides the data transfer task, such that its allocated data buffers become full. The computer will then send an indication to the modem that the computer cannot presently accept any more data. Data may then be buffered up in the modem until the computer is ready to accept more data, or the indication that the computer has stopped receiving data may be propagated upstream to the far-end modem and the far-end computer such that the far-end computer temporarily stops sending data.

In the other direction from the computer to the modem, the modem may perform data compression such that the data rate from the computer to the modem may exceed the physical data rate across the data link from the modem to the far-end modem. To take full advantage of data compression, the data rate from the computer to the modem should exceed the maximum data rate on the data link to the far-end modem, such that the compressed data fully occupies the available bandwidth, or nearly so. The data compression ratio that the modem can achieve varies, however, with the characteristics of the data. The modem must therefore be able to invoke flow control to control the data rate from the computer to the modem as the attainable data compression ratio varies.

Flow control is generally of one of two types, software flow control and hardware flow control.

In software flow control, typically, two special control characters are defined, an "XON" character that signals a device to begin or resume transmission and an "XOFF" character that signals a device to stop transmission. Each data byte received is checked to see if it is XON or XOFF. When XON or XOFF is detected, a software interrupt routine is initiated to take the appropriate action. Because of interrupt latency, data transmission may continue for a period of milliseconds before being stopped. A "high-water mark/low-water mark" strategy is therefore employed, in accordance with which an XOFF character is sent by a device when its buffer is still some number of bytes short of being full, or overflowing, and an XON character is sent by the device when its buffer is still some number of bytes short of being empty. Software flow control is generally only suitable for ASCII data in which the XON and XOFF byte patterns may be reserved. In the case of arbitrary binary data, in which the byte patterns are unconstrained, the XON and XOFF byte patterns might occur in the data itself, which would result in unpredictable behavior if software flow control were used.

In hardware flow control, dedicated signals, for example Request to Send (RTS) and Clear to Send (CTS), are used to signal a device to start or stop transmission of data. However, as in software flow control, occurrence of one of these signals typically causes an interrupt which is then serviced in an interrupt routine. Therefore, although the overhead of checking each byte for a control character is avoided, interrupt latency still requires the use of a high-water mark/low-water mark buffering scheme.

Although modem communications is generally adequate for exchanging text files, the transmission of voice, fax and video data, especially simultaneous, requires a data rate that exceeds the capabilities of most modems. Furthermore, in the case of voice and video data, the transmission of such "isochronous streams" requires that the data be delivered to its destination in an uninterrupted flow. Such streams may be not only isochronous (i.e., constant bit rate) but also "real-time." Real-time data streams are generated continuously during the course of an event and transmitted with minimum delay to the destination. To handle real-time and isochronous data streams using conventional methods of data transfer and flow control would require sizable (and hence costly) device buffers and would entail a great deal of CPU intervention.

To achieve a low-cost telecommunications device capable of handling real-time and isochronous data streams, a data transfer mechanism is needed that overcomes the foregoing disadvantages. Furthermore, a data transfer mechanism is needed that can efficiently accommodate any of various telecommunications devices having a range of capabilities and data rates.

SUMMARY OF THE INVENTION

The present invention, generally speaking, provides a data transfer mechanism for a serial interface whereby data transfer may be precisely controlled, eliminating the need for DMA or significant buffering in a telecommunications device. The data transfer mechanism also provides for flexible data transfer in either a byte mode or a burst mode so as to accommodate any of various telecommunications devices having a range of capabilities and data rates, and minimizes host involvement in the data transfer operation.

More particularly, in accordance with one embodiment of the invention, an apparatus transfers data across a serial link between a memory in a computer system and a telecommunications device that produces a transmit handshake signal and a clock signal having a clock rate, both of which are carried by the serial link. The apparatus includes a direct memory access controller having access to the memory and a serial communications controller connected to the direct memory access controller and connected to the serial link, for handling bidirectional communications across the serial link at an average data rate in each direction less than the clock rate. The serial communications controller includes a transmit holding register connected to a transmit shift register, with the transmit shift register being connected to the clock signal carried by the serial link and to the transmit handshake signal. Shifting of the transmit shift register is clocked by the clock signal and enabled when the transmit handshake signal is asserted. A receive holding register is connected to a receive shift register, with the receive shift register being connected to the clock signal carried by the serial link and to a reference potential, shifting of the receive shift register being clocked by the clock signal and continuously enabled by the reference potential.

In accordance with another embodiment of the invention, one of a first telecommunications device and a second telecommunications device produces a transmit handshake signal to control transfer of transmit data from the memory to the telecommunications device across a serial link that carries the transmit handshake signal. When the first telecommunications device is connected to the serial port, data transfer takes place by the first telecommunications device asserting the transmit handshake signal, in response to which a serial communications controller serially transmits a unit of transmit data to the telecommunications device across the serial link. The serial communications controller then requests a data unit from a direct memory access controller, and the direct memory access controller transfers a data unit to the serial communications controller. The telecommunications device de-asserts the transmit handshake signal, and the foregoing steps are repeated. In this manner, transfer of data is controlled by the telecommunications device on a data-unit-by-data-unit basis. When the second telecommunications device is connected to the serial port, the telecommunications device asserts the transmit handshake signal, and the serial communications controller repeatedly transmits a unit of transmit data to the telecommunications device, requests a data unit from the direct memory access controller, receives a data unit from the direct memory access controller, and again transmits a unit of transmit data to the telecommunications device, until the telecommunications device de-asserts the transmit handshake signal. In this manner, transfer of data is controlled by the telecommunications device on a data-burst basis.

BRIEF DESCRIPTION OF THE DRAWING

The present invention may be further understood from the following written description in conjunction with the appended drawing. In the drawing:

FIG. 1 is a block diagram of a computer system in which the present invention may be used;

FIG. 2 is a block diagram of a portion of the serial communications controller of FIG. 1;

FIG. 3 is a block diagram showing in greater detail a data stream synchronization arrangement of the computer system of FIG. 1;

FIG. 4 is a diagram of a DMA buffer area within the telecom sample DMA buffers of FIG. 3;

FIG. 5 is a block diagram of a first example of a telecommunications device that may be used with the present invention;

FIG. 6 illustrates a procedure used to guarantee time-reference synchronization between the computer system and the telecommunications device of FIG. 5;

FIG. 7 is a block diagram of a second example of a telecommunications device that may be used with the present invention;

FIG. 8 illustrates a procedure used to guarantee time-reference synchronization between the computer system and the telecommunications device of FIG. 7;

FIG. 9 is a timing diagram illustrating timing of a Transmit Handshake signal;

FIG. 10 is a timing diagram illustrating control of single byte transfers using the Transmit Handshake signal; and FIG. 11 is a timing diagram illustrating control of block transfer using the Transmit Handshake signal.

DETAILED DESCRIPTION OF THE PREFERRED EMBODIMENTS

The computer system of FIG. 1 is exemplary of a wide variety of computer systems, both large and small, in which serially-connected communications devices may be found and with which the present data transfer mechanism may be used.

A bus including an address bus portion and a data bus portion connects a central processing unit (CPU) to a read-only memory (ROM), and, through bus transceivers (not shown), to a random-access memory (RAM) and to a serial communications controller (SCC), or the equivalent, that provides an interface to a serial I/O port(s). A telecommunications device is shown connected to the serial port. In addition, a direct memory access (DMA) controller or other device having DMA functionality is connected to the bus and services the serial port. Other I/O devices may also be connected to the bus and may also be serviced by the DMA controller. In other embodiments, the SCC may be connected directly to the DMA controller. The computer system may also be equipped with a digital signal processor (DSP), indicated in dashed lines, as more fully explained below.

The SCC may be of a type such as the 8530 Serial Communications Controller available from Advanced Micro Devices of Sunnyvale, Calif. The SCC of FIG. 1, however, is used in a manner not typical of the prior art. Referring to FIG. 2, showing a portion of the SCC of FIG. 1, a transmit holding register (11) receives a byte of data sent to the SCC from the DMA controller in response to a DMA Request by the SCC. The contents of the transmit holding register are then transferred to a parallel-to-serial converter (13), which shifts out the bits of the data byte one-by-one onto the communications line in accordance with a clock signal CLK. Data is received from the communications line in a complementary manner. Data bits are shifted into a serial-to-parallel converter (15) in accordance with the clock signal CLK. Once a byte has been assembled, it is then transferred to a receive holding register (17) and then transferred to the DMA controller. The transmit holding register (11) with its parallel-to-serial converter (13) and the receive holding register (15) with its serial-to-parallel converter (17) combine to form part of a full-duplex communications channel.

The 8530 SCC includes as inputs a Clear to Send (CTS) input and a Data Carrier Detect (DCD) input. In an Auto Enable mode of operation, CTS enables the transmitter by enabling the parallel-to-serial converter, and DCD enables the receiver by enabling the serial-to-parallel converter. Typically in the prior art, CTS and DCD have been connected in common to a single handshake input signal of the serial port such that both the SCC transmitter and the SCC receiver are either enabled or disabled at the same time. Furthermore, a clock input of the SCC has in the past typically been provided by the CPU motherboard.

In the serial communications system of FIG. 1, on the other hand, a clock input of the SCC is provided through the serial port by the telecommunications device as shown in FIG. 2. Because the telecommunications device is directly servicing the source of the data stream, namely the communications line, the telecommunications device is better able than the computer to maintain the timing of constant bit rate streams. In an exemplary embodiment of the invention, the clock rate provided by the telecommunications device to the SCC through the serial port is 2.048 MHz. Operating the serial port at this rate allows for exchange of digital isochronous streams at up to T1 (telephone system trunk-line) rates.

The need for flow control differs in the transmit and receive directions, in part because of the high speed at which the serial port is operated. In the transmit direction, the actual data rate may be only a fraction of the maximum potential rate of 2.048 Mbps. For example, in an exemplary embodiment, a single telephone connection is supported using a data rate of 256 Kbps, including 128 Kbps of data actually transmitted over the telephone line and 128 Kbps of data transmitted to a telephone handset, which serves as a speaker. Every 10 milliseconds, a frame including 2560 bits of user data is transmitted. Absent flow control, this data would be transmitted to the telecommunications device, using DMA, at the speed of the serial port, namely 2.048 Mbps. In approximate terms, a data rate of 2.048 Mbps is nearly an order of magnitude greater than a data rate of 256 Kbps. Therefore, without flow control, nearly 25,600 bits of user data would be transmitted to the telecommunications device in one millisecond, followed by nine milliseconds of no data. Flow control in the transmit direction avoids imposing on every telecommunications device the requirement that it be able to handle data at the 2.048 Mbps rate.

In the receive direction, the pace of data flow is governed by the communications line as it supplies constant bit rate data. The average data rate between the telecommunications device and the computer is therefore guaranteed not to exceed the constant bit rate of the communications line. Flow control in the receive direction is therefore unnecessary.

In the serial communications system of FIG. 1, therefore, a Transmit Handshake signal TXHS is defined on the serial port and is connected to the transmitter of the SCC, as shown in FIG. 2, so as to function as an Auto Enable for the transmitter. The Transmit Handshake signal is not connected to the receiver of the SCC in the manner of the prior art. Rather, the receiver of the SCC is continually enabled by applying to it a fixed potential. In FIG. 2 therefore, the receiver enable input is grounded.

A data stream synchronization arrangement within the computer uses the Transmit Handshake signal to establish and maintain synchronization between constant bit rate data streams generated by the computer and constant bit rate data streams received from outside the computer over a communications line. A procedure for initialization and operation of the telecommunications device by the host computer, to be described presently in relation to FIG. 3, therefore allows wide-area communications data streams obtained from analog or digital telephone lines to be conveniently manipulated and blended into the computer sound facilities, for example.

For purposes of the following description, the host computer is assumed to contain signal processing resources useful for generation and detection of voice-band data signals (modem), speech generation, voice recognition, sound synthesis, and the like. A digital signal processor is therefore indicated in dashed lines in FIG. 1. The following procedure ensures that a precise integer relationship is maintained between telecom data and the particular subsystem of interest, such that the host interface subsystem data stream is time-aligned with the telecommunications device data stream.

Referring to FIG. 3, the host computer system typically employs a CISC (complex instruction set) microprocessor as the central processor (213). However, contemporary CISC processors by their nature lack sufficient processing capacity to treat the digital telecommunications device datastream in real time. For example, a V.32 analog modem signal could not be generated and delivered to the telecommunications device by the CISC CPU. Therefore, a Digital Signal Processor (DSP 205) is employed as a coprocessor to perform the laborious but requisite signal transformation computations on the telecom data stream.

The DSP is a general purpose resource at the disposal of potentially several host computer clients. The host computer operating system software therefore employs a time-based software scheduling algorithm to ensure its clients of reasonable access to the DSP processing resources. The time-based scheduling concept is based on a list of tasks (206) that are defined by the host processor, and executed in a sequential manner on the DSP. The time-base atomic unit is called a frame. For this reason the time-based scheduling system is also called a frame-based signal processing system.

Operation of the telecommunications device is as follows. The bit-synchronous clock (202) and bidirectional datastreams are delivered to the host computer on the serial interface (2131). The serial data is clocked into a serial-to-parallel converter (15 in FIG. 2) according to the transitions of the bit-synchronous clock. Since the datastream is real-time, continuous, and must be delivered reliably, regardless of tasks that may be running on the central processor (213), a dedicated Direct Memory Access (DMA) channel (212) is used. The DMA circuit moves data between the Telecom Sample Buffers (210) and the telecommunications device.

At the same time, the DSP (205) may be executing a parallel time-based task such as sound synthesis over the system speakers. In this case the speaker (2101) is driven by a codec (207) from the sound sample buffers (209) which are filled as a result of computations made by the DSP. Again, since the datastream is real-time synchronous, a DMA channel (208) is dedicated to the sound system to ensure reliable transfer of the sound samples to the speaker.

In order to provide for the reliable exchange of sample data between the host computer sound system and the telecommunications device, the sound sample buffer must maintain a fixed phase and time relationship with the telecom sample buffer. Note that, at the same time, the DSP operates according to a time-based scheduling algorithm. Therefore the following procedure is implemented. First, the telecom clock, which was previously shown to be bit-synchronous and in phase with the datastream delivered by the telecommunications device, is delivered to the host computer SCC (211) and a Phase-Locked Loop (203). The telecom data clock is used to synchronize the sound clock (201) which nominally operates at an integer multiple of the telecom data clock. Thus the sound clock is phase-aligned with the telecom data clock.

The output of the PLL is then passed to a clock divider (204) which reduces the clock frequency to yield a periodic pulse. This periodic pulse defines the DSP time frame and is used to awaken the DSP and cause it to execute the task list. The tasks are executed repetitively according to the periodic pulse, which has a nominal period of ten milliseconds. Included in the task list are the sound generation task(s), the telecom sample processing task(s), and a sample rate conversion task. The purpose of the sample rate converter (2111) is to transform the N samples found in the telecom sample buffer into M samples loaded into the sound sample buffer by the DSP. However, there must be a strict time alignment between the sound buffer and the telecom sample buffer. Therefore, the telecommunications device is initialized in precise reference to the output of the clock divider (204).

The telecommunications device is presumed to have a RESET line which may be driven by the host computer. The RESET line holds the telecom data and clock lines in a quiescent state, when asserted. The clock line is activated, and sampling commences, when the RESET line is de-asserted. One of two or more procedures, to be described in relation to FIG. 6 and FIG. 8, respectively, is executed by the System CPU (213) whereby the output of the clock divider is monitored, such that the telecommunications device RESET input is asserted and released at the appropriate time to guarantee time-reference synchronization.

After the initialization sequence is executed, data is delivered from the telecommunications device to the host computer with both phase and time alignment. Therefore the DSP, which is time scheduled for frame-based processing, is assured that the N telecom samples, which arrive from the telecommunications device via the system DMA hardware, are entirely coincident with the generation of the M sound samples contained in the sound sample DMA buffer.

The foregoing procedure requires that data to be transmitted to the telecommunications device be at least double buffered. FIG. 4 shows in greater detail a transmit portion of the telecom sample DMA buffers (210) of FIG. 3. A circular buffer (20) includes a first buffer portion (23) and a second buffer portion (25). Each buffer portion holds one DSP frame of data. In a preferred embodiment, a frame consisting of 322 data bytes, including two bytes of control information, is produced by the DSP every 10 ms. The DMA controller is programmed to remove a frame of data from the circular buffer every 10 ms. The DMA controller runs continuously, relieving the host CPU of the burden of reprogramming the DMA controller at frequent intervals.

At any given time, one of the buffer portions is designated as a read buffer and another of the buffer portions is designated as a write buffer. The DMA controller reads data from the read buffer and the DSP writes data to the write buffer. When the DSP has written a full frame of data to the write buffer, the roles of the buffers are "flipped", i.e., the write buffer becomes the new read buffer and the read buffer becomes the new write buffer. The circular nature of the buffer, together with flipping the roles of the buffers as described, makes it possible to run the DMA controller continuously, providing a stream of isochronous or real-time data to the telecommunications device.

The telecommunications device may be a telecommunications device for connecting to the analog telephone network, as illustrated in FIG. 5, providing a versatile, general-purpose interface to the wide-area communications analog telephone network. Referring to FIG. 5, the telecommunications device contains analog-to-digital conversion facilities (103), electrical and mechanical interface hardware (105), clock generation and/or recovery circuits (104), serial-to-parallel translation hardware (101) to exchange the digital data between the telecommunications device and host computer; and a state machine (microcontroller 102) which manages the synchronization and delivery of digital samples to the host via a time-division-multiplexed data stream. The analog data streams are derived from signals from the telephone channel (106) and a standard telephone desk set (107).

A serial interface protocol and procedure is defined for attaching the telecommunications device through a short cable to the serial port of a computer workstation. The computer workstation is assumed to be equipped with direct memory access (DMA) whereby DMA may be used to service the serial port and off-load the computer's central processing unit (CPU), allowing continuous real-time communications to be maintained.

The external telephone network connects to the telecommunications device at jack (106). This signal is then conditioned by a suitable electrical interface to provide proper signal amplification and filtering before submission to the codec (digitizer) interface (103). The codec is clocked by an internally generated oscillator (104). This oscillator is also used to derive the telecom sample clock (108) that is delivered to and employed by the host for datastream synchronization as previously explained. Digitized samples are clocked between host and telecommunications device bit-synchronously and in phase with sample generation in the telecommunications device. Thus no buffering of digital data within the telecommunications device is required.

Using full-duplex DMA hardware in the computer, a time-division-multiplex (TDM) interface may be supported. A transmit handshake line (110) is provided on the serial interface as shown in FIG. 5. When the telecommunications device wishes to exchange a set of data from a constant bit rate (CBR) real-time data stream with the computer, it simply transmits any bytes to be transmitted to the computer and then uses the transmit handshake line (110) to force the computer to transmit the appropriate number of bytes to the telecommunications device. In this way, the constant bit rate stream can be maintained without any intervention by the computer's CPU. Because the telecommunications device is directly servicing the source of the stream, namely the communications line, the telecommunications device is better able than the computer to maintain the timing of the constant bit rate stream.

Control of the telecommunications device through the TDM interface is performed by a software telecommunications device handler routine in the computer. Typically, TDM data streams are broken up into fixed length frames consisting of a control field and a data field. The control field carries device specific information, and the information field carries the data. These frames are repeated at a fixed period of time, called the frame period. The control field is used by the software handler to set up data buffers for these frames. The specifics of the control field depend on the specific hardware implementation of the telecommunications device.

FIG. 6 illustrates a procedure executed by the System CPU (213) whereby the output of the clock divider is monitored, such that the RESET input of the telecommunications device of FIG. 5 is asserted and released at the appropriate time to guarantee time-reference synchronization.

Referring to FIG. 6, and recalling the data stream synchronization arrangement of FIG. 3, prior to time 1 the system CPU will have already set up the DMA controller to start receiving data into the third sample of the receive buffer where the DSP will expect to get the samples at the end of the 10 ms period. The system CPU will also have set up the DMA controller to start transmitting data from the transmit buffer which will have been initialized with two frames worth of null samples. When the system CPU sees the 10 ms timer fire at time 1, it will activate the RESET signal, bringing the telecommunications device into operation. The telecommunications device will then grab the next receive sample from the codec and transmit it to the host, where DMA will place it into the receive buffer. The telecommunications device will then activate the Tx Handshake line long enough to receive one sample from the host, which will be fed to the codec at the next sampling period. The telecommunications device will continue to exchange samples with the host in this way until the RESET signal is inactivated. Each sample exchange consists of the telecommunications device sending four receive bytes to the host and the telecommunications device retrieving four transmit bytes from the host, consisting of one sample for each of two channels and two bytes per sample.

When the DSP receives a 10 ms interrupt at time 2, there will be 80 receive samples in the receive buffer. The DSP will block move these samples into its own memory. The DSP must skip every other sample in the buffer since both channel's samples are in the buffer. Once the DSP has all the receive samples it will process these and produce transmit samples within 10 ms.

When the next 10 ms time goes off at time 3, the DSP will have placed the transmit samples in the transmit buffer beginning with the first location after the initial 160 null samples. The next time the telecommunications device and host exchange samples the real transmit samples will begin being sent. The maximum delay between a receive sample and its corresponding transmit sample will be two frame periods plus four sample periods, in this case 20 ms+(4*125 $\mu$s)=20.5 $\mu$s.

Instead of a telecommunications device for connecting to the analog telephone network (FIG. 5), the telecommunications device may be a telecommunications device for connecting to digital telephone services such as ISDN. Such a telecommunications device is shown in FIG. 7. The telecommunications device contains a microprocessor (CPU 303), a random access memory control and program store (RAM 305), a read-only memory for system initialization and diagnostics (ROM 304), a direct-memory-access controller (DMA 301) to exchange the digital data between the communications facilities and the telecommunications device and between the telecommunications device and host computer, a serial interface (302) to the host computer system using High-Level Datalink Control (HDLC) signalling; and an interface transceiver (not shown) which couples the telecommunications device to the physical transmission medium. In a preferred embodiment, the CPU is realized by a 68302 microcontroller running a real-time multi-talking operating system such as the Apple Real-time Operating System Environment (AROSE).

A serial interface protocol and procedure is defined for attaching the telecommunications device through a short cable 107 to the serial port 100 of a computer workstation. A transmit handshake line (110) is provided on the serial interface. When the telecommunications device wishes to exchange a set of data from a constant bit rate (CBR) real-time data stream with the computer, it simply transmits any bytes to be transmitted to the computer and then uses the transmit handshake line (110) to force the computer to transmit the appropriate number of bytes to the telecommunications device. In this way, the constant bit rate stream can be maintained without any intervention by the computer's CPU. Because the telecommunications device is directly servicing the source of the stream, namely the communications line, the telecommunications device is better able than the computer to maintain the timing of the constant bit rate stream.

The telecommunications device additionally includes an ISDN physical interface (311) connected to the external ISDN network, to a deskset (113), and to a main bus (315) of the telecommunications device. First and second serial ports (317) and (319) send and receive user data to and from the ISDN physical interface across the two 64 kbps "B Channels" defined in accordance with ISDN. Data from the serial ports is buffered in the RAM (305) of the telecommunications device by the DMA controller (301). A telecom sample clock (108) is delivered to and employed by the host for data stream synchronization as previously explained. In a preferred embodiment, the ISDN physical interface is realized by a 79C30 ISDN chip. The serial parts are each realized by the equivalent of an 8530 Serial Communications Controller chip. In the case of Serial Port #3, the Serial Communications Controller chip is used as described previously in relation to FIG. 2, such that the Transmit Handshake signal effects flow control in the transmit direction but has no effect on receive operation.

Using full-duplex DMA hardware in the computer, a DMA interface may be supported in which data is packetized for transmission using HDLC. Multiple logical streams are supported using a stream identifier field appearing at the beginning of the packet. Each stream may be designated (by a higher protocol level) as a control stream, an asynchronous stream, or an isochronous stream. Stream flags are used to designate the beginning and ending packets in a block of data which is to be delivered as one unit, to designate command/response data, and for flow control signalling. Multiple packets can be sent in one HDLC frame.

By substituting the appropriate physical interface circuitry for the ISDN physical interface circuitry (311), the telecommunications device of FIG. 7 may be adapted to connect computer workstations to Private Branch Exchange (PBX) communications facilities, or, more generally, to virtually any telecommunications network. Because the serial interface between the host computer and the telecommunications device supports multiple independent data streams, arbitrary signalling and control functions may be achieved by designating one or more streams as control streams. This ability allows the telecommunications device to provide a fully-generalizable hardware/software core that may be used to connect to any of a wide variety of PBXs, some of which employ digital signalling, some of which employ analog signalling, and some of which employ hybrid signalling.

In addition, software for the telecommunications device is downloadable from the host computer. This ability allows the telecommunications device to be programmed to handle any of the numerous proprietary PBX formats by downloading the appropriate software routines from the host computer. Equally important, the telecommunications device provides a debugging facility to aid in code development. A downloader and a debugger are resident in the ROM (304) and are accessed via designated control streams.

FIG. 8 illustrates a procedure executed by the System CPU (213) whereby the output of the clock divider is monitored, such that the RESET input of the telecommunications device of FIG. 7 is asserted and released at the appropriate time to guarantee time-reference synchronization.

At time 1 the host computer waits for transmission of any asynchronous transmit data in the DMA pipe to be completed; the host computer then waits for the 10 ms timer to expire, whereupon the host computer transmits a Frame Sync packet to the telecommunications device indicating the 10 ms frame boundary. At time 2, the telecommunications device upon reception of the Frame Sync Packet takes the last two samples as the first two samples of an 80 sample 10 ms frame. The telecommunications device upon collecting the 78th sample begins the Frame Data Packet. Since it takes approximately 325 µs to send the packet and two more samples take 250 µs, the last two samples will be in the buffer by the time the last two bytes are sent in the packet. This procedure provides at least a one sample period margin, i.e., sample period 2, between the time the last sample is received into the host computer's DMA buffer and the time when the DSP chip grabs the samples in response to the DSP's 10 ms timer firing.

The host computer can transmit asynchronous data up until a safe period, time 3, before it will be required to transmit outbound samples (the host computer must keep track of how much data is in the DMA pipe and the current time). At the time of the final asynchronous data transmission (which could be simply a synchronizing control signal) the host computer will send an End-of-Async-Data signal which indicates to the telecommunications device that it should disable the Tx Handshake line. The telecommunications device will not reenable the Tx Handshake line until the beginning of the fourth sample period to guarantee that the DSP chip has been given a full 10 ms to generate transmit samples. During this isochronous data setup period the host computer can begin setting up a new DMA buffer with asynchronous data but not will not enable it until after the transmit samples are sent. The telecommunications device can send asynchronous data between periods that it sends receive samples, i.e., during the time interval 4, but must insure getting receive samples to the host computer (taking advantage of the one-sample-period leeway) by the time the DSP expects to grab them. Hence the telecommunications device cannot fill up its DMA pipe so much that it overruns this period.

At time 5, the host computer gets a Tx Handshake change interrupt (SCC CTS interrupt), upon which it will program the DMA to send the data from the transmit sample buffer and enable DMA; data will not be sent until the telecommunications device reenables Tx Handshake. At time 6, the telecommunications device will reenable Tx Handshake at the start of the 4th sample period, upon which the transmit samples will be sent to the telecommunications device. At time 7, the host computer after the transmission of the transmit samples will receive a DMA completion interrupt, upon which it can begin sending asynchronous data until the next isochronous data setup period.

The telecommunications devices of FIG. 5 and FIG. 8 represent only two examples of telecommunications devices with which the present data transfer mechanism may be used to achieve flexible, efficient serial communications. At low communications data rates, byte-by-byte transfer may be used with little or no buffering of data to minimize device cost. At progressively higher communications data rates, burst-mode transfer may be employed.

Timing of the Transmit Handshake signal to execute single byte transfers and block transfer is illustrated in FIG. 9, FIG. 10, and FIG. 11. Referring first to FIG. 9, serial transmission of a Byte i, a last portion of a previous Byte i−1, and a first portion of a next Byte i+1 is illustrated. A byte is transmitted as one or more start bits followed by eight data bits, a parity bit, and one or more stop bits. In response to a stop bit, the telecommunications device latches in the received byte.

The telecommunications device may precisely control data transfer to ensure that exactly a desired number of bytes are transmitted from the computer by observing the timing requirements illustrated in FIG. 9. If Byte i is to be the last byte transferred, for example, the Transmit Handshake signal must be deactivated within a time window that begins just before the start bit of Byte i and end just after the last data bit, D7, of Byte i. A minimum hold time is specified following the parity bit of Byte i−1 to guarantee that one more byte, Byte i, will be sent.

Similarly, a minimum setup time is specified preceding the stop bit of Byte i to guarantee that no more bytes will be sent.

In FIG. 10, the Transmit Handshake line is deactivated within the specified timing window at each byte transfer to control the transfer of BYTE 1, BYTE 2, BYTE 3 and BYTE 4 on a byte-by-byte basis. As indicated by the broken line, any desired amount of time may elapse between transfer of one byte and transfer of a next byte.

In FIG. 11, the Transmit Handshake line is activated and thereafter not deactivated until the specified timing window of BYTE 4. BYTE 1 through BYTE 4 are therefore transferred one after another at the serial link data rate without pause.

At communication data rates approaching the maximum rate of 2.048 Mbps, the Transmit Handshake line will be asserted continuously or nearly so. Some buffering may then be necessary, for example to maintain a constant stream of data on the communications line during receipt of control header information from the host. In such an instance, a high-water-mark/lower-water-mark type of scheme may be used to advantage. The amount of buffer space required will nevertheless be greatly reduced as compared to the prior art, and the precision with which data transfer may be controlled will be greatly increased.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a computer system having a memory including a direct memory access buffer area, and having a direct memory access controller and a serial communications controller connected to a serial port, a method in which one of a first telecommunications device and a second telecommunications device produces a transmit handshake signal to control transfer of transmit data from the memory to said one of the first telecommunications device and the second telecommunications device across a serial link that carries the transmit handshake signal, the method comprising the steps of:
   a) when the first telecommunications device is connected to the serial port;
   b) the first telecommunications device asserting the transmit handshake signal;
   c) the serial communications controller serially transmitting a unit of transmit data to the first telecommunications device across the serial link;
   d) the serial communications controller requesting a data unit from the direct memory access controller;
   e) the direct memory access controller transferring a data unit to the serial communications controller;
   f) the first telecommunications device de-asserting the transmit handshake signal; and repeating steps a) through e);

whereby transfer of data is controlled by the first telecommunications device on a data-unit-by-data-unit basis; and when the second telecommunications device is connected to the serial port;

g) the second telecommunications device asserting the transmit handshake signal;

h) the serial communications controller serially transmitting a unit of transmit data to the second telecommunications device across the serial link;

i) the serial communications controller requesting a data unit from the direct memory access controller;

j) the direct memory access controller transferring a data unit to the serial communications controller; and repeating steps h) through j) until the first telecommunications device de-asserts the transmit handshake signal;

whereby transfer of data is controlled by the second telecommunications device on a data burst basis.

2. An apparatus for exchanging real-time data between a memory in a computer system and a telecommunications device, across a serial link that carries a transmit handshake signal, the apparatus comprising:

a transmit buffer area designated in said memory and including at least a first buffer area for storing a first group of transmit data ready for transfer to the telecommunications device and a second buffer area for storing a second group of transmit data being computed for subsequent transfer to the telecommunications device;

a processor for computing the transmit data of the second group;

a serial communications controller connected to the serial link for requesting and receiving units of transmit data and for, only when the transmit handshake signal is active, transmitting the units of transmit data on the serial link; and a direct memory access controller connected to the memory, to the processor and to the serial communications controller, for transferring the transmit data of the second group from the processor to the second buffer area and for transferring the transmit data of the first group from the first buffer area to the serial communications controller responsive to requests from the serial communications controller, the direct memory access controller being programmed to alternately designate first one and then another of the buffer areas as the first buffer area each time the first buffer area is emptied, and to continuously transfer the transmit data of the first group from the first buffer area to the serial communications controller responsive to requests from the serial communications controller, thereby emptying the first buffer area a multiplicity of times, without being reprogrammed.

3. The apparatus of claim 2, further comprising a receive buffer area designated in said memory, wherein the serial link carries a telecommunications clock signal input to the serial communications controller and wherein said serial communications controller receives units of receive data on the serial link whenever the telecommunications clock signal is active.

4. The apparatus of claim 3, wherein the DMA controller is responsive to requests from the serial communications controller to transfer receive real-time data from the serial communications controller to the receive buffer area.

5. The apparatus of claim 4, further comprising a clock divider connected to the telecommunications clock signal and to the processor for providing to the processor a periodic pulse once for every P pulses of the clock signal.

6. The apparatus of claim 5, wherein the processor is a digital signal processor that performs frame-based processing in accordance with a task list.

7. The apparatus of claim 4, further comprising:

a sound system;

a sound sample buffer area designated in said memory; and sample rate conversion means for converting a group of N samples received from the telecommunications device into a group of M sound samples and storing the M sound samples in said sound sample buffer area.

8. The apparatus of claim 7, wherein said sound system comprises a sound clock that produces a sound clock signal, an audio codec and a speaker.

9. The apparatus of claim 8, further comprising a PLL for synchronizing the sound clock signal and the telecommunications clock signal.

10. The apparatus of claim 4, wherein said serial link further carries a reset signal, the apparatus comprising means for activating said reset signal and for storing a received data unit in a predetermined location within the receive buffer area.

11. The apparatus of claim 10, wherein the predetermined location follows a first location within the receive buffer area with at least one location intervening.

* * * * *